United States Patent Office 3,755,405
Patented Aug. 28, 1973

3,755,405
TERTIARY POLYFLUOROALKYL HYPOCHLORITES AND PROCESS FOR THE PREPARATION THEREOF
Douglas E. Gould, Boonton, David E. Young, Denville, Lowell Ray Anderson, Parsippany, and William B. Fox, Morris Township, Morris County, N.J., assignors to Allied Chemical Corporation, New York, N.Y.
No Drawing. Filed Oct. 30, 1968, Ser. No. 772,037
Int. Cl. C07c 71/00
U.S. Cl. 260—453 R    2 Claims

ABSTRACT OF THE DISCLOSURE

Tertiary polyfluoroalkyl hypochlorites of the formula:

$$R-(OCl)_n$$

wherein $n$ is 1 or 2, R contains at least four carbon atoms and is an open chain YZ-perfluoroalkyl group when $n$ is 1, R is an open chain YZ-perfluoroalkylene group when $n$ is 2, wherein Y and Z are substituents on the R moiety and are the same or different electronegative groups selected from F, $FSO_2$, $FSO_3$, $NO_2$, perfluoroalkyl, perfluorocycloalkyl and perfluoroaryl, with the proviso that the carbon atom or atoms attached to the —OCl group or groups are each bonded to three other carbon atoms; may be prepared by reacting corresponding tertiary alcohols with chlorine monofluoride (ClF). The novel tertiary polyfluoroalkyl hypochlorites are useful as polymerization initiators, as chlorinating agents, as bleaching agents and are valuable intermediates for the synthesis of other useful compounds.

CROSS-REFERENCES TO RELATED APPLICATIONS

Copending application of D. E. Gould et al., entitled, "Novel Polyhaloorgano Hypochlorites and Process for the Preparation Thereof," Ser. No. 734,515, filed June 5, 1968.

BACKGROUND OF THE INVENTION

Various tertiary organo hypohalites are known in the prior art. For example, tertiary butyl hypochlorite is disclosed in U.S. Pat. 3,149,140; tertiary cycloaliphatic hypohalites are disclosed in U.S. Pat. 2,675,402; tertiary perfluorobutyl hypofluorite is disclosed by J. H. Prager et al. J.A.C.S., 87, 230 (1965).

SUMMARY OF THE INVENTION

We have discovered a novel class of tertiary polyfluoroalkyl hypohalites possessing unusual properties not possessed by the most closely related tertiary organo hypohalites known to the prior art. These novel compounds are tertiary polyfluoroalkyl hypochlorites of the formula:
(I)    $R-(OCl)_n$ wherein $n$ is 1 or 2, R contains at least four carbon atoms and is an open chain YZ-perfluoroalkyl group when $n$ is 1 and an open chain YZ-perfluoroalkylene group when $n$ is 2, wherein Y and Z are substituents on the R moiety and are the same or different electronegative groups selected from F, $FSO_2$, $FSO_3$, $NO_2$, perfluoroalkyl, perfluorocycloalkyl and perfluoroaryl, with the proviso that the carbon atom or atoms attached to the —OCl group or groups are each bonded to three other carbon atoms.

These compounds are useful as sources of active chlorine which can be taken advantage of in bleaches and as chlorinating agents capable of chlorinating unsaturated bonds in organic compounds and to replace hydrogen atoms in organic compounds. Fumes of the novel hypochlorites are toxic to insects and other animal life. The novel hypochlorites are also useful as initiators for the polymerization of unsaturated compounds and are valuable intermediates for the synthesis of other useful compounds.

The novel hypochlorites possess a number of unexpected and unusual properties as compared with the closest related prior art compounds, the corresponding hypofluorites and the corresponding non-halogenated hypochlorites.

For example, at temperatures between —20° C. and room temperature the novel hypochlorites react readily with carbon monoxide to yield the corresponding chloroformates of the formula:

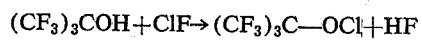

wherein R and $n$ are as defined above. These chloroformates are useful as fumigants, catalysts for the polymerization of unsaturated compounds and in the preparation of polycarbonates, polyesters and formaldehyde polymers. When it is attempted to react the corresponding hypofluorites or the corresponding non-halogenated hypochlorites under similar conditions, no reaction takes place.

It has further been discovered that the novel tertiary polyfluoroalkyl hypochlorites may be prepared by reacting the corresponding polyhalo tertiary alcohol with chlorine monofluoride (ClF). This reaction is illustrated by the following:

$$(CF_3)_3COH + ClF \rightarrow (CF_3)_3C-OCl + HF$$

The novel tertiary polyfluoroalkyl hypochlorites cannot be prepared by the method disclosed in copending application, Ser. No. 734,515 mentioned supra, in view of the unavailability of corresponding tetiary polyfluoroalkyl carbonyl starting materials.

DETAILED DESCRIPTION AND THE PREFERRED EMBODIMENTS

With reference to Formula I above, the Y and Z substituents may be the same or different electronegative groups. Preferably Y and Z are both fluorine.

The preferred number of carbon atoms in the R group is from 4–15. Compounds in which the R group contains more than 15 carbon atoms may be prepared, however, and exhibit the same properties.

As can be seen from Formula I, when $n$ is 1 a class of tertiary polyfluoroalkyl hypochlorites is defined. When $n$ is 2, a corresponding class of tertiary polyfluoroalkyl dihypochlorites is formed. When $n$ is 1 the R group preferably contains from 4–6 carbon atoms. When $n$ is 2, the R group preferably contains from 6–10 carbon atoms and still preferably from 6–8 carbon atoms.

Illustrative compounds within the scope of the invention are as follows:

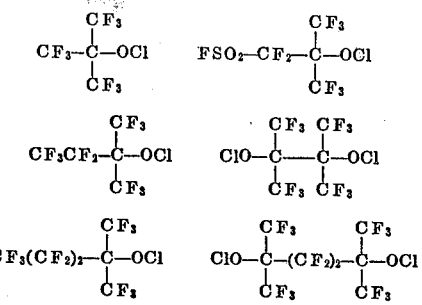

The tertiary polyhalo alcohol starting materials are a known class of materials and may be prepared by conventional methods.

The reaction of the tertiary polyhalo alcohol with ClF to produce the novel hypochlorites of the invention proceeds readily without a catalyst.

Reaction temperatures for the ClF reaction vary over a wide range. The reaction takes place easily at room temperature (about 25° C.) or below. The reaction will proceed at temperatures as low as −78° C. and also at temperatures considerably higher than room temperature. In view of the ready reaction at low temperatures, there is no advantage in supplying heat to the reaction. Preferred reaction temperatures range from about −20° C. to about 25° C. Depending on the particular starting alcohol employed, the optimum reaction temperatures may vary within the above indicated range. The optimum temperature range for a particular reaction can thus be determined routinely.

Atmospheric, sub- or super-atmospheric pressures may be successfully employed in the practice of the invention process.

The reaction can be carried out with the reactants in liquid, vapor or solid phase. An inert solvent such as, for example, a halogenated hydrocarbon such as $CFCl_3$ may be employed.

The stoichiometry of the reaction to produce the monohypochlorites requires 1 mol of ClF per mol of starting alcohol. In the case of the bihypochlorites, 2 mols of ClF per mol of dihydroxy starting compounds are required. In order to ensure complete reaction, at least the stoichiometric amount or a slight excess of the ClF reactant should be employed. There is no advantage in employing large stoichiometric excesses of the reagents although large excesses of the same will not deleteriously affect the reaction.

Materials of construction for the apparatus used for the subject reactions should be inert to the reactants employed. Stainless steel and fluoropolymers, for example polytetrafluoroethylene and polychlorotrifluoroethylene are illustrations of suitable types of materials for this purpose.

The following example is intended to be illustrative only. Parts and percentages are by weight unless otherwise indicated.

EXAMPLE 1

Conventional vacuum techniques using a metal (nickel- "Monel") "Plaskon" (trademark of Allied Chemical Corp. for a polymer of chlorotrifluoroethylene) type fluoropolymer system were used to condense 3 mmol of

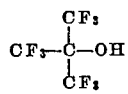

and an excess of ClF into a 30-ml. stainless steel "Hoke" cylinder equipped with a stainless steel "Hoke" needle valve. The product mixture was allowed to warm to room temperature (about 25° C.) and then react overnight. At the end of this period, the excess ClF was removed by fractionating the product mixture between traps maintained at −95° C and −196° C. A yellowish liquid was retained in the −95° C. trap and was identified as being $(CF_3)_3C$—OCl, B.P. 25° C./295 mm.

*Analysis.*—Calculated for $C_4F_9ClO$ (percent): C, 17.74; Cl, 13.12; F, 63.22. Found (percent): C, 17.40; Cl, 13.84; F, 64.91.

EXAMPLE 2

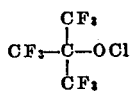

is contacted with CO in about a 1:1 molar ratio at −20° C. Reaction takes place readily to yield the corresponding chloroformate.

EXAMPLE 3

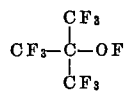

is contacted with CO under the same conditions described in Example 2. No reaction takes place. The reaction temperature is raised to 25° C. and still no reaction takes place.

EXAMPLE 4

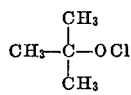

is contacted with CO under the same conditions described in Example 2. No reaction takes place. The reaction temperature is raised to 75° C. and still no reaction takes place.

What is claimed is:

1. The process for preparing tertiary polyfluoroalkyl hypochlorites of the formula: R—(OCl) wherein R contains from 4 to 15 carbon atoms and is an open chain perfluoroalkyl group with the proviso that the carbon atom or atoms attached to the —OCl group or groups are each bonded to three other carbon atoms comprising reacting a compound of the formula: R—(OH) wherein R is as defined above with ClF.

2. The process for preparing:

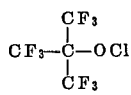

which comprises reacting

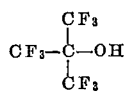

with ClF.

References Cited

UNITED STATES PATENTS

| | | |
|---|---|---|
| 3,091,643 | 5/1963 | Wiley. |
| 3,317,615 | 5/1967 | Graham. |

FOREIGN PATENTS

| | | | |
|---|---|---|---|
| 2560,219 | 7/1968 | Canada | 260—453 R |

OTHER REFERENCES

Graham et al., "Fluoride Ion Initiated Reactions, Etc." (1966).

Brown, "Electronegativity, Non-bonded Interactions and Polarizability in the Hydrogen Halides and the Interhalogen Halides" (1961), J.A.C.S. 83, pp. 36–42 (1961).

Prager et al., "Prep. and Characterization of New Fluoroxy Compounds," cited by appl.

Ruff et al., "A Simple Synthesis of Fluoroxyperfluoroalkyl Compounds" (1966), J.A.C.S. 88, pp. 4531–32 (1966).

Mayer et al., "Computation of High Temperature Rate, Etc." (1966), CA 69, p. 537 (1968).

Schack et al., J.A.C.S. 91, pp. 2902–07 (1969).

Hale et al., Inorg. Chem. 4, pp. 1342–46 (1965).

ELBERT L. ROBERTS, Primary Examiner

G. HOLLRAH, Assistant Examiner

U.S. Cl. X.R.

8—109; 260—95 R, 463; 424—149